United States Patent
Park

(10) Patent No.: US 12,344,209 B2
(45) Date of Patent: Jul. 1, 2025

(54) ELECTRIC DRUM BRAKE SYSTEM AND CONTROL METHOD THEREOF

(71) Applicant: HL MANDO CORPORATION, Gyeonggi-do (KR)

(72) Inventor: Jaehyun Park, Seoul (KR)

(73) Assignee: HL MANDO CORPORATION, Gyeonggi-do (KR)

(*) Notice: Subject to any disclaimer, the term of this patent is extended or adjusted under 35 U.S.C. 154(b) by 110 days.

(21) Appl. No.: 17/530,480

(22) Filed: Nov. 19, 2021

(65) Prior Publication Data

US 2022/0185255 A1 Jun. 16, 2022

(30) Foreign Application Priority Data

Dec. 14, 2020 (KR) .................. 10-2020-0174408

(51) Int. Cl.
| | | |
|---|---|---|
| B60T 13/74 | (2006.01) | |
| F16D 65/22 | (2006.01) | |
| H02P 6/24 | (2006.01) | |
| H02P 6/28 | (2016.01) | |
| F16D 66/00 | (2006.01) | |
| F16D 121/24 | (2012.01) | |

(52) U.S. Cl.
CPC ............ B60T 13/741 (2013.01); F16D 65/22 (2013.01); H02P 6/24 (2013.01); H02P 6/28 (2016.02); F16D 2066/001 (2013.01); F16D 2121/24 (2013.01)

(58) Field of Classification Search
CPC . B60T 13/741; H02P 6/28; H02P 6/24; F16D 65/22; F16D 2066/001; F16D 2121/24
USPC .......................................................... 701/70
See application file for complete search history.

(56) References Cited

U.S. PATENT DOCUMENTS

2004/0113486 A1* 6/2004 Koga ...................... B60T 13/66
303/20

FOREIGN PATENT DOCUMENTS

| CN | 105579310 A | * | 5/2016 | ............ B60T 13/588 |
| JP | 2005119343 A | * | 5/2005 | ............ B60T 13/741 |
| JP | 2007-126142 | | 5/2007 | |
| JP | 2020-50065 | | 4/2020 | |
| JP | 2020050065 A | * | 4/2020 | |
| JP | 7155876 B2 | * | 10/2022 | |

(Continued)

OTHER PUBLICATIONS

Office Action (1st) dated May 21, 2025 for Korean Patent Application No. 10-2020-0174408 and its English translation provided by Applicant's foreign counsel.

*Primary Examiner* — Lindsay M Low
*Assistant Examiner* — Omar Morales
(74) *Attorney, Agent, or Firm* — WOMBLE BOND DICKINSON (US) LLP

(57) ABSTRACT

Provided is an electric drum brake system, including: an electric drum brake configured to be driven by an electric motor; a current sensor configured to detect a current input to the electric motor; and a controller configured to, when parking is released, determine a parking release time based on a temperature of the electric drum brake, and when a maintenance time reaches the determined parking release time, end a parking release operation by stopping the electric motor, the maintenance time being a period of time while a state where a motor current detected by the current sensor reaches a target current is maintained.

4 Claims, 5 Drawing Sheets

(56) References Cited

FOREIGN PATENT DOCUMENTS

KR  10-2013-0038093  4/2013
KR  10-2015-0124587  11/2015

* cited by examiner

ELECTRIC DRUM BRAKE SYSTEM AND CONTROL METHOD THEREOF

CROSS-REFERENCE TO RELATED APPLICATION

This application is based on and claims priority under 35 U.S.C. § 119 to Korean Patent Application No. 10-2020-0174408, filed on Dec. 14, 2020 in the Korean Intellectual Property Office, the disclosure of which is incorporated herein by reference.

BACKGROUND

1. Field

The disclosure relates to an electric drum brake system that generates a parking brake force by operating a drum brake by a motor and a control method thereof.

2. Description of the Related Art

Korean Patent Unexamined Publication No. 10-2013-0038093 discloses a drum united type electrical parking brake that is electrically operated by an actuator to generate a parking brake force.

In a motor-on-caliper electronic parking brake (MOC EPB), when engaged at a high temperature, as the temperature drops, a clamping force may decrease due to thermal stress of brake pads and brake disc.

By contrast, when an electric drum brake is engaged at a high temperature, as the temperature drops, a clamping force may increase due to thermal stress of a drum. When the engagement of the electric drum brake is released in a state where the temperature is not sufficiently lowered, a clamping force is not sufficiently reduced, and thereby may cause drag of a vehicle.

SUMMARY

An aspect of the disclosure provides an electric drum brake system that may prevent drag of a vehicle by compensating for a release time of an electric drum brake according to a temperature of the electric drum brake and a control method thereof.

Additional aspects of the disclosure will be set forth in part in the description which follows and, in part, will be obvious from the description, or may be learned by practice of the disclosure.

According to an aspect of the disclosure, there is provided an electric drum brake system, including: an electric drum brake configured to be driven by an electric motor; a current sensor configured to detect a current input to the electric motor; and a controller configured to, when parking is released, determine a parking release time based on a temperature of the electric drum brake, and when a maintenance time reaches the determined parking release time, end a parking release operation by stopping the electric motor, the maintenance time being a period of time while a state where a motor current detected by the current sensor reaches a target current is maintained.

The controller is configured to determine the parking release time based on a temperature of a drum of the electric drum brake.

The controller is configured to determine the parking release time when the temperature of the drum is high to be longer than the parking release time when the temperature of the drum is low.

The controller is configured to determine the parking release time so that parking release time increases as the temperature of the drum increases.

According to another aspect of the disclosure, there is provided a control method of an electric drum brake system including an electric drum brake driven by an electric motor, the control method including: when parking is released, determining a parking release time based on a temperature of the electric drum brake, and when a maintenance time reaches the determined parking release time, ending a parking release operation by stopping the electric motor, the maintenance time being a period of time while a state where a motor current input to the electric motor reaches a target current is maintained.

The determining of the parking release time determines the parking release time based on a temperature of a drum of the electric drum brake.

The determining of the parking release time determines the parking release time when the temperature of the drum is high to be longer than the parking release time when the temperature of the drum is low.

The determining of the parking release time determines the parking release time so that parking release time increases as the temperature of the drum increases.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
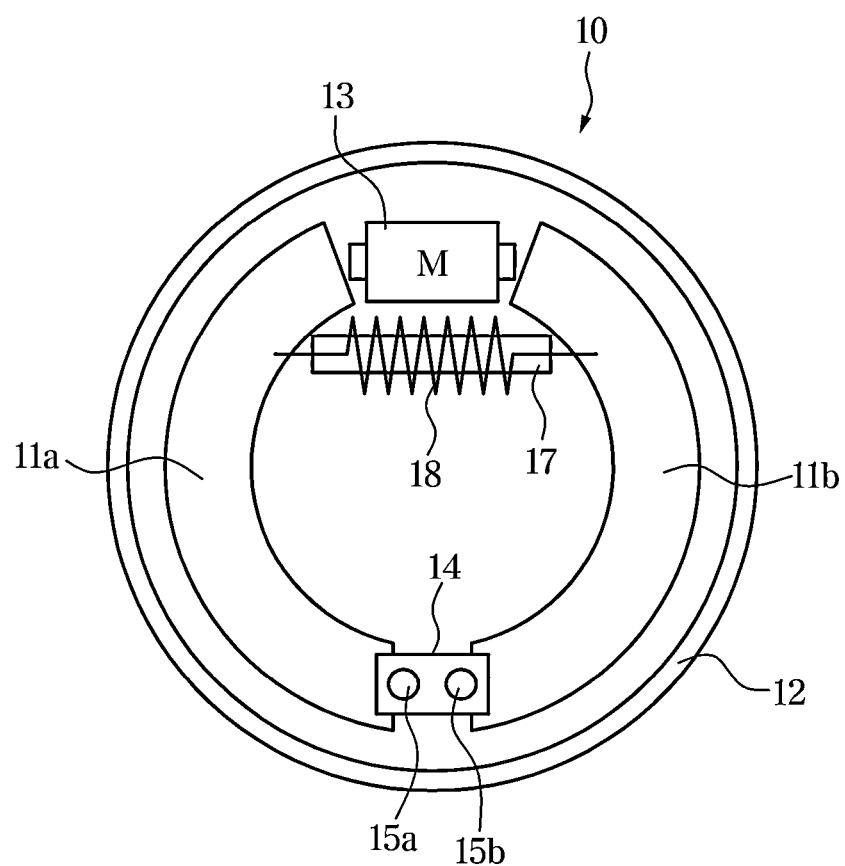
FIG. 1 is a diagram illustrating an electric drum brake applied to an electric drum brake system according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~device", "~module", and the like may refer to a unit for processing at least one function or act. For example, the terms may refer to at least process processed by at least one hardware or software. According to embodiments, a plurality of "~parts", "~devices", or "~modules" may be embodied as a single element, or a single of "~part", "~device", or "~module" may include a plurality of elements.

It will be understood that when an element is referred to as being "connected" to another element, it can be directly or indirectly connected to the other element, wherein the indirect connection includes "connection" via a wireless communication network.

It will be understood that the terms "include" when used in this specification, specify the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms. It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

FIG. 1 is a diagram illustrating an electric drum brake applied to an electric drum brake system according to an embodiment.

Referring to FIG. 1, the electric drum brake 10 applied to the electric drum brake system has a structure where a drum 12 rotating together with a wheel is provided therein and a pair of brake shoes 11a and 11b to which a pair of brake linings are attached expands for braking. In general, the electric drum brake 10 is mounted on a rear wheel of a vehicle.

The electric drum brake 10 may include the pair of brake shoes 11a and 11b, the drum 12, and an electric actuator 13. The pair of brake shoes 11a and 11b in an arc shape are installed movably along a surface of a backing plate coupled to a vehicle body. The drum 12 having an inner circumferential friction surface rotates with the wheel. The electric actuator 13 applies force to each of the pair of brake shoes 11a and 11b in a direction of expanding the pair of brake shoes 11a and 11b.

One end of each of the pair of brake shoes 11a and 11b facing each other is connected to the electric actuator 13 installed on the backing plate. Also, another end of each of the pair of brake shoes 11a and 11b is connected to each of pins 15a and 15b of an anchor member 14 fixed to the backing plate, and thus the pair of brake shoes 11a and 11b do not rotate with the drum 12. Here, the other end is opposite to the one end connected to the electric actuator 13.

A strut 17 and a spring 18 are provided between the pair of brake shoes 11a and 11b. The strut 17 serves as an adjuster that adjusts a gap between the inner circumferential friction surface of the drum 12 and the pair of brake linings according to wear of the pair of brake linings. Also, the pair of brake shoes 11a and 11b are fixed to both ends of the spring 18, respectively, and the spring 18 is arranged so that the pair of brake shoes 11a and 11b are close to each other.

The electric actuator 13 includes an electric motor M, a reducer, a pressurization mechanism including a ball screw mechanism. When the electric motor M rotates in one direction, rotation of an output shaft and deceleration of the rotation of the electric motor M by the reducer simultaneously occur. Also, the rotation of the electric motor M is converted into a linear motion by the ball screw mechanism, and the pair of brake shoes 11a and 11b are pressed in a direction away from each other. Accordingly, the pair of brake shoes 11a and 11b to which the pair of brake linings are attached press the drum 12, and thereby may generate a braking force. When the electric motor M rotates in opposite direction, the pair of brake shoes 11a and 11b pressing the drum 12 are separated from the drum 12 and the braking force is released.

Figure 2:
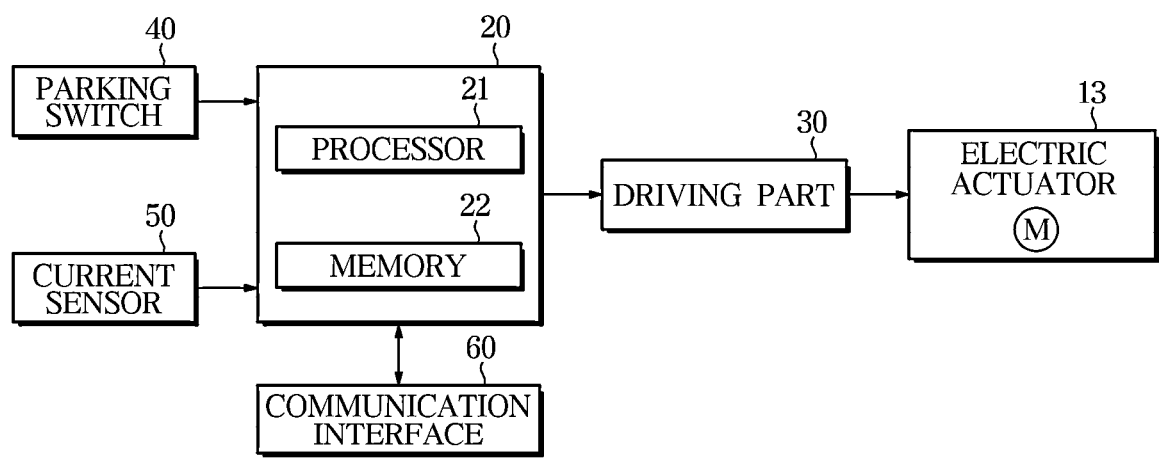
FIG. 2 is a control block diagram illustrating an electric drum brake system according to an embodiment.

FIG. 2 is a control block diagram illustrating an electric drum brake system according to an embodiment.

Referring to FIG. 2, the electric drum brake system may include the electric drum brake 10, a controller 20, a driving part 30, a parking switch 40, a current sensor 50, a communication interface 60. The electric drum brake 10 is provided in at least one of vehicle wheels, and the controller 20 controls an operation of the electric drum brake 10. The driving part 30 drives the electric actuator 13 of the electric drum brake 10 by a control signal of the controller 20. The parking switch 40 outputs a parking switch signal indicating a parking operation state or a parking release state operated by a driver. The current sensor 50 detects a current supplied to an electric motor M of the electric actuator 13. The communication interface 60 transmits/receives a communication signal to/from various systems installed in a vehicle through a vehicle communication network.

The controller 20 may be referred to as an electronic control unit (ECU).

The controller 20 may include a processor 21 and a memory 22.

The controller 20 may include one or more processors 21. The one or more processors 21 included in the controller 20 may be integrated into a single chip or physically separated. Also, the processor 21 and the memory 22 may be implemented as a single chip.

The processor 21 may control overall operations of the electric drum brake system.

The memory 22 may store data and/or a program for the processor 21 to process data.

The memory 22 may include a volatile memory such as a static random access memory (S-RAM), a dynamic random access memory (D-RAM), and the like, and a non-volatile memory such as a read only memory (ROM), an erasable programmable read only memory (EPROM), and the like.

The controller 20 described above may perform a parking operation mode for engaging the electric drum brake 10 or a parking release mode for disengagement, by an operation signal of the parking switch 40 operated by the driver or an operation signal generated by a program related to operations of the electric drum brake 10.

In the parking operation mode, the controller 20 enables the pair of brake shoes 11a and 11b to be in close contact with the drum 12 using the electric actuator 13 of the electric drum brake 10, and thereby may perform a parking apply operation that generates a clamping force required for parking.

In the parking release mode, the controller 20 enables the pair of brake shoes 11a and 11b in contact with the drum 12 to be separated from the drum 12 using the electric actuator 13 of the electric drum brake 10, and thereby may perform a parking release operation that releases the generated clamping force.

In the parking operation mode, the controller 20 rotates the electric motor M in one direction until a current value of the electric motor M of the electric actuator 13 reaches a target current value corresponding to the clamping force required for parking.

Meanwhile, in the parking release mode, the controller 20 rotates the electric motor M in opposite direction until a current of the electric motor M reaches a target current value corresponding to parking release.

The driving part 30 may rotate the electric motor M forward or reverse according to the control signal of the controller 20. For example, the driving part 30 may include an H-bridge circuit including a plurality of power switching elements to rotate the electric motor M forward or reverse. In the parking operation mode where the electric motor M rotates in one direction by the driving part 30, the one way rotation of the electric motor M is decelerated by a reducer, a ball screw mechanism is moved linearly with a large force, the pair of brake shoes 11a and 11b are pressed with the drum 12, and thus wheels may be braked. The parking release may be operated in an opposite way to the parking operation.

The controller 20 may receive a parking switch signal indicating a parking operation state or a parking release state operated by a driver from the parking switch 40.

The controller 20 may receive a current of the electric motor M. The current of the electric motor M is detected by the current sensor 50.

The controller 20 may receive a variety of vehicle states such as a brake pedal state, gear shift information, wheel speed information, braking pressure information, etc., from various systems through the communication interface 60.

The controller 20 may identify a parking operation request for engaging the electric drum brake 10 or a parking release request for disengaging the electric drum brake 10 according to information input from the parking switch 40 or input through the communication interface 40.

As described above, after engaging the electric drum brake 10 at a high temperature, as the temperature drops, a clamping force increases due to thermal contraction of the thermal expanded drum 12. When the electric drum brake 10 is disengaged in a state where the temperature is not sufficiently lowered, the clamping force is not sufficiently reduced due to the thermal contraction of the drum 12, and thereby may cause drag of a vehicle.

That is, in an existing electric drum brake, when a current value of the electric motor M of the electric actuator 13 is lowered to a target current, which is a preset parking release current value, and then such state is maintained for a preset period of time, the parking release operation for disengaging the electric drum brake 10 is determined to be completed, and thus the parking release operation is ended by stopping the electric motor M. However, when the drum 12 is at a high temperature at a time of parking release, the clamping force may remain due to the thermal contraction even when the parking release operation is ended. Accordingly, the clamping force is not sufficiently released by applying only the target current and the preset period of time, and thus drag of the vehicle may occur.

Therefore, the electric drum brake system according to an embodiment of the disclosure may prevent drag of the vehicle by compensating for a release time of the electric drum brake 10 according to a temperature of the electric drum brake 10.

The controller 20 may estimate the temperature of the drum 12 using various information input through the communication interface 60. The controller 20 may estimate the temperature of the drum 12 from wheel speed information and braking pressure information input through the communication interface 60.

For instance, once a driver pushes a brake pedal for reducing speed during driving, the pair of brake shoes 11a and 11b to which brake linings are attached apply pressure to the drum 12. When frictional force is generated by contact between the drum 12 and the brake linings, kinetic energy of the vehicle is converted into frictional energy between the drum 12 and the brake linings. The frictional energy is converted into thermal energy, some of which escapes into air or is absorbed by the drum 12. In this instance, the thermal energy absorbed by the drum 12 raises the temperature of the drum 12. By contrast, while the vehicle is running without braking or is stopped, the thermal energy absorbed by the drum 12 is released into atmosphere or a surrounding connected component in a form of conduction, convection, and radiation, and thus the temperature decreases. A mathematical model for calculating the temperature of the drum 12 may be created using the above conversion process of thermal energy. The frictional energy generated from the frictional force is converted into the thermal energy and absorbed by the drum 12. The thermal energy generated by the frictional force may be expressed as a function of a friction coefficient of the brake linings, braking pressure, wheel speed, and the like. While the vehicle is running without braking or is stopped, the thermal energy absorbed by the drum 12 is released into atmosphere or a surrounding connected component in a form of conduction, convection, and radiation. A sum of the thermal energies escaping from the drum 12 in the form of conduction, convection, and radiation may be calculated by adding all of respective thermal energies. The thermal energy cooled according to a speed of the vehicle may be expressed as a function of wheel speed, atmosphere temperature, and the like. A final temperature of the drum 12 is determined by a difference between a thermal energy absorbed for a specific period of time and a thermal energy transferred to an outside. A current temperature of the drum 12 may be obtained by an amount of change in temperature due to the difference between the two thermal energies. The temperature of the drum 12 may be calculated continuously while the vehicle is running. Also, the controller 20 may directly detect the temperature of the drum 12 through a temperature sensor that detects the temperature of the drum 12.

Figure 3:
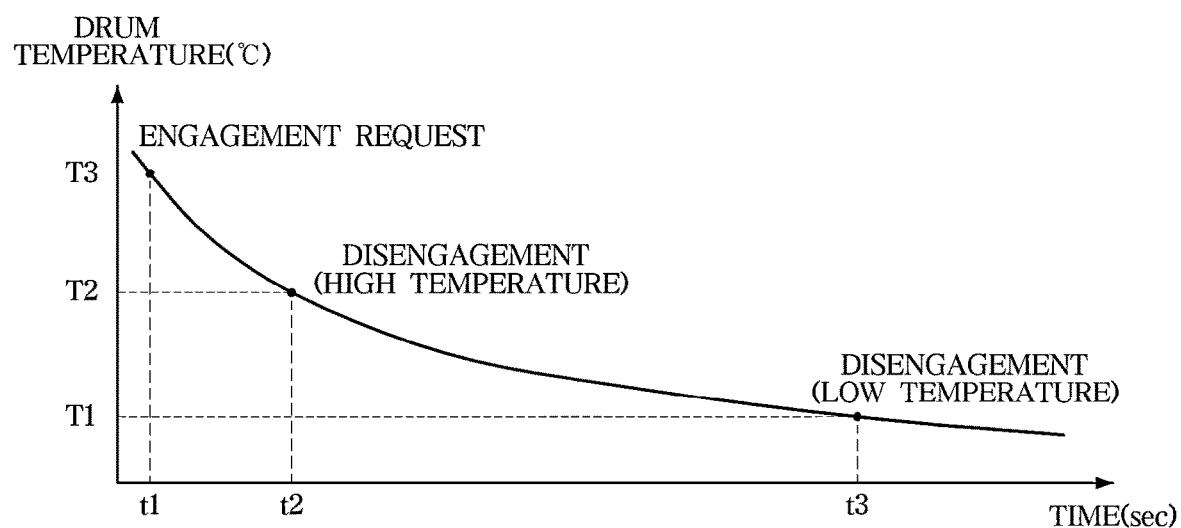
FIG. 3 is a graph illustrating drum temperatures when parking is operated and when parking is released in an electric drum brake system according to an embodiment.

FIG. 3 is a graph illustrating drum temperatures when parking is operated and when parking is released in an electric drum brake system according to an embodiment.

Referring to FIG. 3, a vertical axis represents a drum temperature (° C.), a horizontal axis represents a time (sec), t1 represents a point in time at which a engagement is requested, t2 represents a point in time at which disengagement is requested at a high temperature, and t3 represents a point in time at which the disengagement is requested at a low temperature.

It is assumed that the engagement of the electric drum brake 10 is requested at t1 and T3, and the electric drum brake 10 is in a parking operation state.

The temperature of the drum 12 decreases, as time elapses after parking is operated.

As the temperature of the drum 12 decreases, a clamping force may increase due to thermal contraction of the drum 12.

Accordingly, a parking release time is required to be adjusted considering the clamping force that varies depending on the temperature of the drum 12.

When disengagement of the electric drum brake 10 is requested at T1 (T1<T2<T3) which is a relatively low temperature at t3, and when disengagement of the electric drum brake 10 is requested at T2 (T1<T2<T3) which is a relatively high temperature at t2, drag may be prevented by compensating for the parking release time by applying parking release times different from each other.

Figure 4:
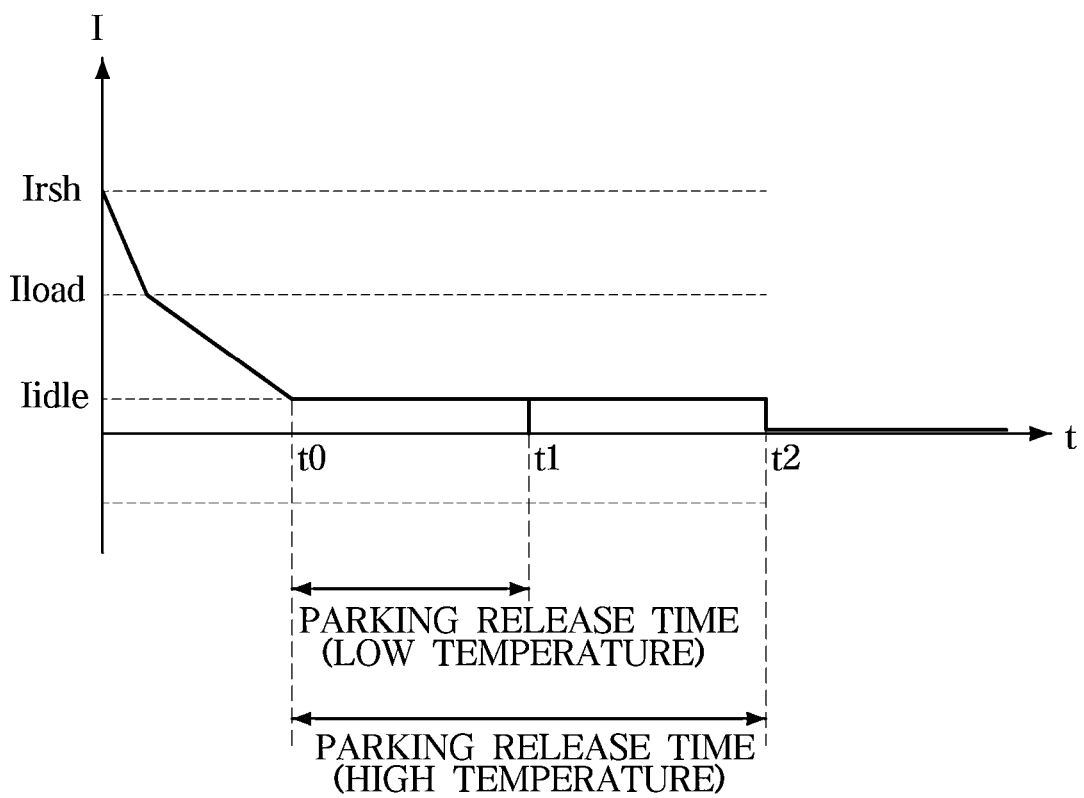
FIG. 4 is a graph illustrating parking release times that vary according to a drum temperature when parking is released in an electric drum brake system according to an embodiment.

FIG. 4 is a graph illustrating parking release times that vary according to a drum temperature when parking is released in an electric drum brake system according to an embodiment.

Referring to FIG. 4, a current pattern input to the electric motor M of the electric actuator 13 during a parking release operation is shown.

A short in-rush section exists, because the electric motor M is to be moved in an early stage of the parking release operation. Differently from a parking operation, an entry into a load section occurs before the in-rush section ends. Afterwards, the pair of brake shoes 11a and 11b to which brake linings are attached are pulled in a direction away from the drum 12 by the electric actuator 13. In this instance, unlike the parking operation, the brake linings do not contact the drum 12, and thus a point in time to end the parking release operation may not be determined using only motor current. Accordingly, a current input to the electric motor M is cut off by determining the point in time to end the parking release operation using the motor current and a period of time while an idle section is maintained, in order to avoid drag that occurs when the brake linings are in close contact with the drum 12.

When a temperature of the drum 12 is low, the parking release time may be set to a first period of time from t0 to t1.

When the temperature of the drum 12 is high, the parking release time may be set to a second period of time from t0 to t2.

Accordingly, the second period of time which is the parking release time when the temperature of the drum 12 is high may be set longer than the first period of time which is the parking release time when temperature of the drum 12 is low.

When the temperature of the drum 12 is low, the current input to the electric motor M reaches an idle current Iidle, and such current state is maintained for the first period of time (t0-t1), the electric motor M is stopped and the parking release operation ends. Here, the idle current Iidle is set lower than a load current Iload, and Irsh represents an in-rush current.

When the temperature of the drum 12 is high, the current input to the electric motor M reaches the idle current Iidle, and such current state is maintained for the second period of time (t0-t2), the electric motor M is stopped and the parking release operation ends. Here, the idle current Iidle is set lower than the load current Iload.

As described above, the parking release time when the temperature of the drum 12 is high is set to be longer than the parking release time when the temperature of the drum 12 is low, and thus a distance between the drum 12 and the brake linings may be increased. Accordingly, even when thermal contraction of the drum 12 occurs, a clamping force may not remain, and thereby may prevent drag.

Figure 5:
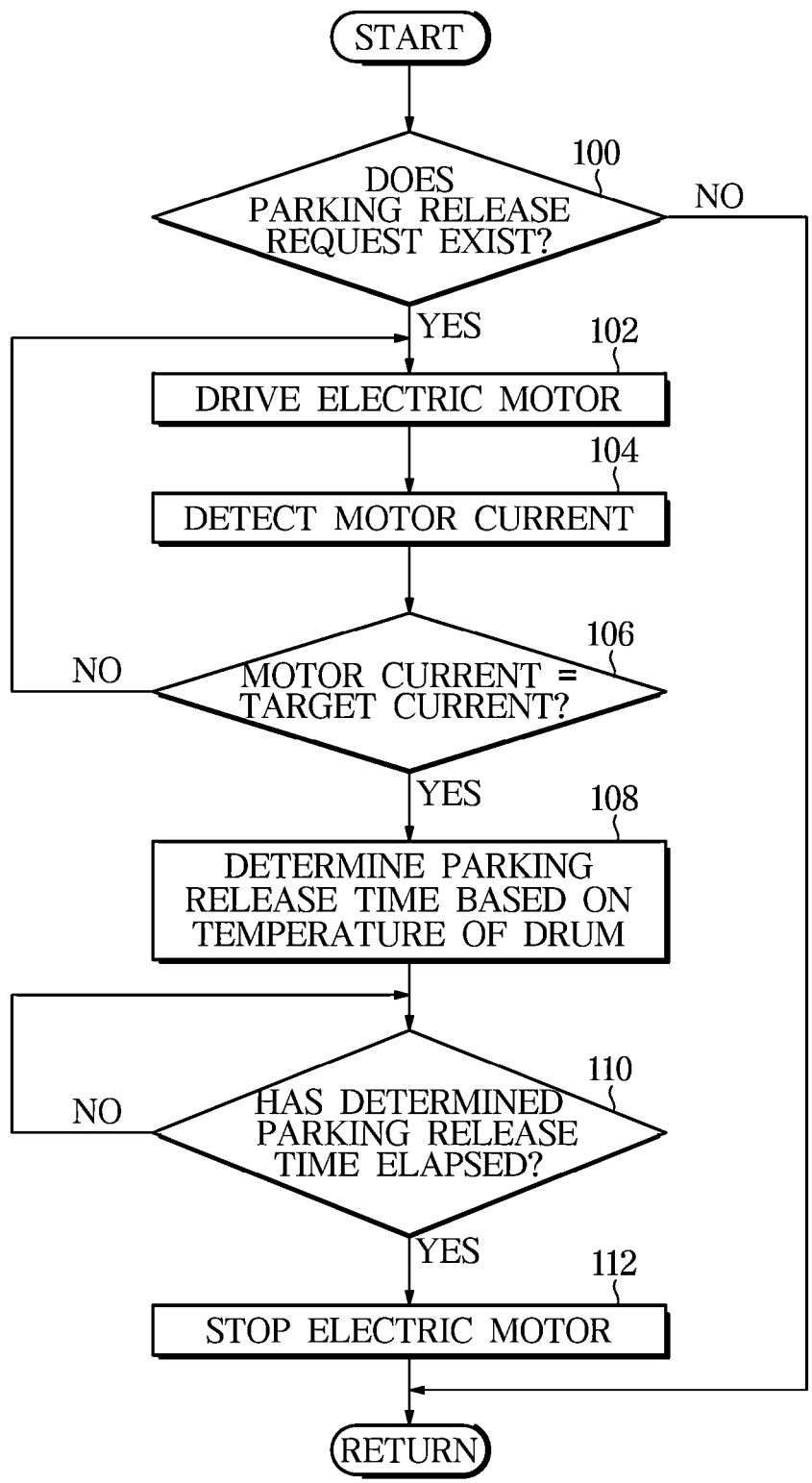
FIG. 5 is a flowchart illustrating a control method of an electric drum brake system according to an embodiment.

FIG. 5 is a flowchart illustrating a control method of an electric drum brake system according to an embodiment.

Referring to FIG. 5, the control method of the electric drum brake system may include determining whether a parking release request exists (100), driving an electric motor M (102), detecting a motor current (104), determining whether the motor current reaches a target current (106), determining a parking release time based on a temperature of the drum 12 (108), determining whether the determined parking release time elapsed (110), and stopping the electric motor M (112).

The controller 20 determines whether the parking release request exists while parking is operated.

The controller 20 may determine that the parking release request exists, when a gear is shifted from parking to driving in a state where a brake pedal is depressed while parking is operated.

When the parking release request exists, the controller 20 drives the electric motor M for disengagement, and returns the pair of brake shoes 11a and 11b expanded towards the drum 12 to their original state.

The controller 20 detects a motor current value input to the electric motor M through the current sensor 50.

The controller 20 compares the motor current value and a target current value Iidle, and when the motor current value decreases to the target current value Iidle, the controller 20 determines that the motor current reaches the target current.

When the motor current reaches the target current, the controller 20 determines the parking release time which is a period of time while the motor current maintains the target current, based on the temperature of the drum 12. The controller 20 may estimate the temperature of the drum 12 from wheel speed information and braking pressure information, or directly detect the temperature of the drum 12 through a temperature sensor. The controller 20 may determine the parking release time when the temperature of the drum 12 is high to be longer than the parking release time when the temperature of the drum 12 is low. That is, the controller 20 may set the parking release time to be shorter as the temperature of the drum 12 is lower, and the parking release time to be longer as the temperature of the drum 12 is higher.

When a period of time for maintaining a state in which the motor current reaches the target current reaches the determined parking release time and the parking release time elapses, the controller 20 stops the electric motor M to end the parking release operation.

As is apparent from the above, according to the embodiment of the disclosure, the electric drum brake system and the control method thereof can prevent drag of a vehicle by compensating for a release time of the electric drum brake 10 according to a temperature of the electric drum brake 10.

Meanwhile, the aforementioned controller and/or its constituent components may include at least one processor/microprocessor(s) combined with a computer-readable recording medium storing a computer-readable code/algorithm/software. The processor/microprocessor(s) may execute the computer-readable code/algorithm/software stored in the computer-readable recording medium to perform the above-described functions, operations, steps, and the like.

The aforementioned controller and/or its constituent components may further include a memory implemented as a non-transitory computer-readable recording medium or a transitory computer-readable recording medium. The memory may be controlled by the aforementioned controller and/or its constituent components and configured to store data, transmitted to or received from the aforementioned controller and/or its constituent components, or data processed or to be processed by the aforementioned controller and/or its constituent components.

Also, the disclosed embodiment may be implemented as the computer-readable code/algorithm/software in the computer-readable recording medium. The computer-readable recording medium may be a non-transitory computer-readable recording medium such as a data storage device capable of storing data readable by the processor/microprocessor(s). For example, the computer-readable recording medium may be a hard disk drive (HDD), a solid state drive (SDD), a silicon disk drive (SDD), a read only memory (ROM), a compact disc read only memory (CD-ROM), a magnetic tape, a floppy disk, an optical recording medium, and the like.

What is claimed is:

1. An electric drum brake system, comprising:
   an electric drum brake configured to be driven by an electric motor;
   a current sensor configured to detect a current input to the electric motor; and
   a controller configured to, when parking is released, determine a parking release time based on a temperature of the electric drum brake, and when a maintenance time reaches the determined parking release time, end a parking release operation by stopping the electric motor, the maintenance time being a period of time while a state where a motor current detected by the current sensor reaches a target current is maintained,
   wherein the controller is configured to determine the parking release time based on a temperature of a drum of the electric drum brake such that the parking release time increases as the temperature of the drum of the electric drum brake increases,
   wherein the electric drum brake includes a pair of brake shoes, the drum, and an electric actuator, the pair of brake shoes in an arc shape are installed movably along a surface of a backing plate coupled to a vehicle body, the drum having an inner circumferential friction surface rotates with the wheel, and the electric actuator applies force to each of the pair of brake shoes in a direction of expanding the pair of brake shoes, and
   wherein one end of each of the pair of brake shoes facing each other is connected to the electric actuator installed on the backing plate, and another end of each of the pair of brake shoes is connected to each of pins of an anchor member fixed to the backing plate such that the pair of brake shoes do not rotate with the drum.

2. The electric drum brake system of claim 1, wherein the controller is configured to determine the parking release time when the temperature of the drum is high to be longer than the parking release time when the temperature of the drum is low.

3. A control method of an electric drum brake system including an electric drum brake driven by an electric motor, the control method comprising:
   when parking is released, determining a parking release time based on a temperature of the electric drum brake, and
   when a maintenance time reaches the determined parking release time, ending a parking release operation by stopping the electric motor, the maintenance time being a period of time while a state where a motor current input to the electric motor reaches a target current is maintained,
   wherein the determining of the parking release time determines the parking release time based on a temperature of a drum of the electric drum brake such that the parking release time increases as the temperature of the drum of the electric drum brake increases,
   wherein the electric drum brake includes a pair of brake shoes, the drum, and an electric actuator, the pair of brake shoes in an arc shape are installed movably along a surface of a backing plate coupled to a vehicle body, the drum having an inner circumferential friction surface rotates with the wheel, and the electric actuator applies force to each of the pair of brake shoes in a direction of expanding the pair of brake shoes, and
   wherein one end of each of the pair of brake shoes facing each other is connected to the electric actuator installed on the backing plate, and another end of each of the pair of brake shoes is connected to each of pins of an anchor member fixed to the backing plate such that the pair of brake shoes do not rotate with the drum.

4. The control method of claim 3, wherein the determining of the parking release time determines the parking release time when the temperature of the drum is high to be longer than the parking release time when the temperature of the drum is low.

* * * * *